Jan. 7, 1930. J. S. BUCKNAM, JR., ET AL Re. 17,550

COMBINED AWNING AND SHUTTER

Original Filed Feb. 25, 1927 2 Sheets-Sheet 1

INVENTORS
Joseph S. Bucknam Jr. & William T. De Groot
BY
Duell Dunn & Anderson
ATTORNEYS.

Jan. 7, 1930. J. S. BUCKNAM, JR., ET AL Re. 17,550

COMBINED AWNING AND SHUTTER

Original Filed Feb. 25, 1927 2 Sheets-Sheet 2

INVENTORS.
Joseph S. Bucknam Jr. & William J. De Groot
BY
Duell Dunn & Anderson
ATTORNEYS.

Patented Jan. 7, 1930 Re. 17,550

UNITED STATES PATENT OFFICE

JOSEPH S. BUCKNAM, JR., AND WILSON F. DE GROAT, OF FORT LAUDERDALE, FLORIDA

COMBINED AWNING AND SHUTTER

Original No. 1,668,938, dated May 8, 1928, Serial No. 170,901, filed February 25, 1927. Application for reissue filed May 15, 1928. Serial No. 277,911.

This invention relates to awnings and more particularly to devices of this character arranged additionally to function as shutters.

The general object of the invention is to provide an awning having a plurality of sections assembled in such manner that they may variously cover the whole or part of a window or the like.

Another object is to combine the sections so that they may variously assume different inter-related positions with respect to a window frame to which one of them is secured.

A feature of the invention resides in the provision of a covering adapted to enclose an opening, the cover being designed to open in the form of an awning, having the appearance, utility and operable characteristics of the usual canvas structure.

Another feature resides in the provision of a lever arrangement whereby the awning may be opened and substantially fixed in open position, and be returned to closed position without the necessity for securing operating ropes or the like.

Further features reside in the simplicity of the arrangement, its adaptability to be easily and inexpensively manufactured, readily installed and operated with little effort. The structure is so designed that its durability insures long life, rarely if ever necessitating repair.

The invention accordingly comprises the features of construction combinations of elements, and arrangement of parts, which will be exemplified in the construction hereinafter set forth and the scope of the application of which will be indicated in the claims.

For a fuller understanding of the nature and objects of the invention reference should be had to the following detailed description taken in connection with the accompanying drawing, in which.

Figure 6:
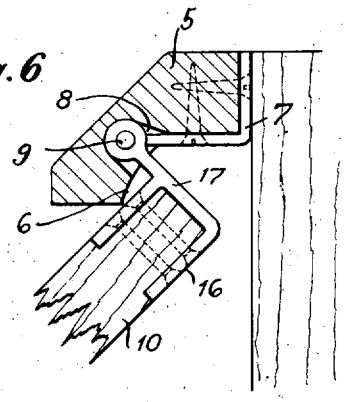
Fig. 6 is a sectional view disclosing more clearly the means of attachment of the device to the window frame.

Now having particular reference to the drawings, A designates a conventional sliding sash frame within a building and rigidly anchored to the outer side thereof. At its upper edge is a horizontal weather shed strip 5 having an inclined forward surface as more clearly disclosed in Figure 6 and formed at its rear side with a longitudinally extending channel 6, the outer surface of which is of rounded contour, while the top surface is flat as clearly disclosed in Figure 6. Secured to the back surface of this weather shed strip is one or more L-brackets 7, the inner end of which projects beneath the flat upper surface of the channel 6 and enters a rounded socket 8 therein.

Figure 1:
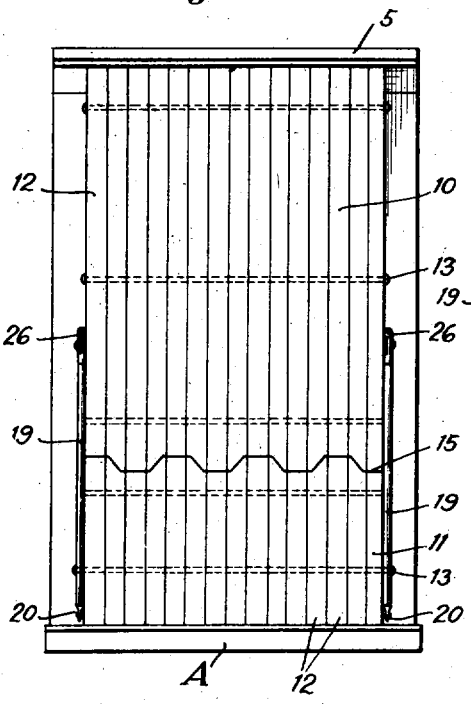
Figure 1 is an elevation of a window frame in a building opening equipped with our improved device, the same being disclosed as providing a shutter for the window.
Figure 2:
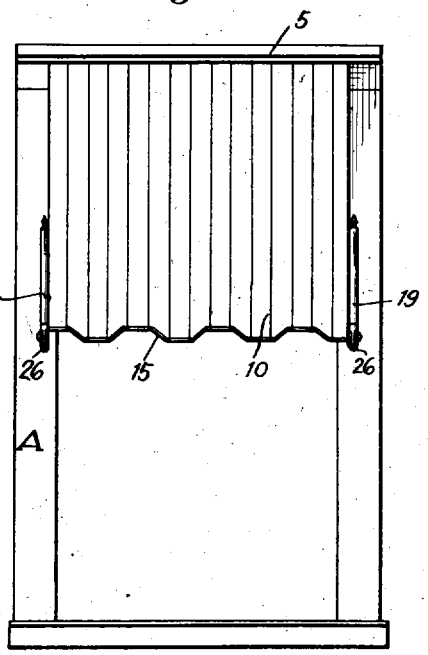
Fig. 2 is a similar view, the device being raised to provide an awning.
Figure 3:
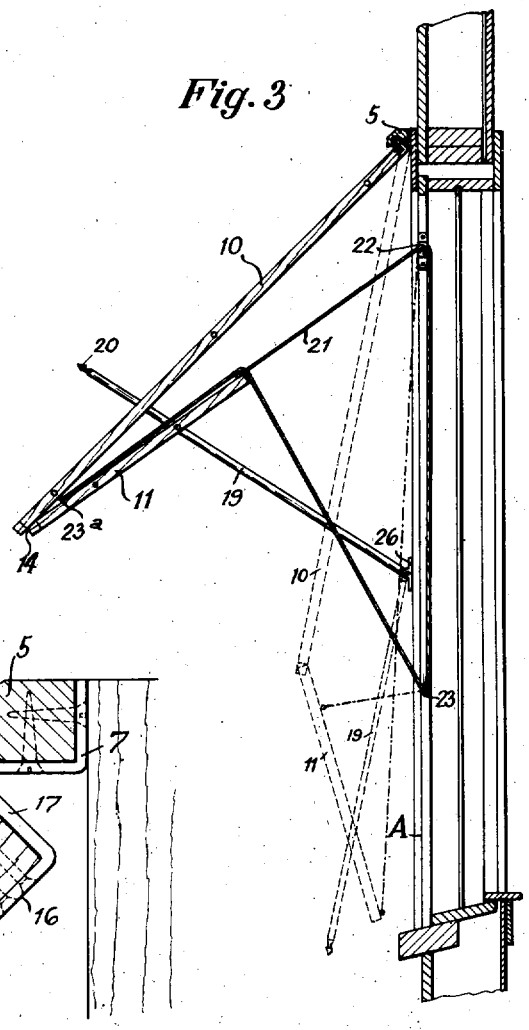
Fig. 3 is an enlarged vertical section through the window disclosing the device in edge elevation, the full line position being the awning position, while the dotted lines represent the device in partially closed position for providing a shutter for the window.

The shutter and awning per se consists of a main panel 10 and a sub-panel 11 of less length than the main panel as clearly indicated in Figures 1 and 3. Each of these panels consists of a single or a plurality of wood or other suitable strips of material 12 laid in edge-to-edge relation and interconnected through the medium of horizontal tie rods 13 extending therethrough. The panels 10 and 11 are hingedly interconnected as at 14, so that the panel 11 may swing rearwardly beneath the panel 10 but to prevent the outward swinging movement of the panel 11 with respect to said panel 10. Furthermore, the adjacent edges of these panels are formed with interfitting scallops 15 mainly for increasing the ornamental appearance of the edge of the main section 10 when the device is extended to provide an awning as more clearly disclosed in Figure 2.

Arranged upon the upper edge of the main panel 10 is one or more U-brackets 16 depending upon the number of the L-shaped brackets 7 secured to the weather shed strip 5, this bracket being formed with a forwardly projecting finger 17 having a flattened end with a hole in the center for receiving a pin 9 fitting within said bracket 7 so as to provide a hinged connection between the panel and the strip 5.

Figure 4:
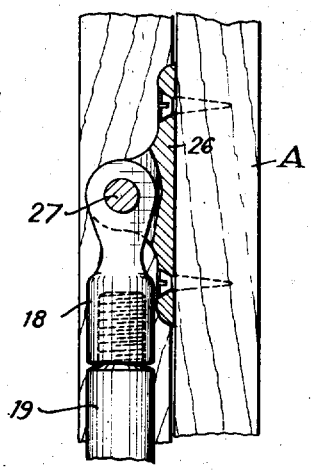
Fig. 4 is an enlarged section disclosing one of the pivotal connections between one of the supporting bars and the window frame.
Figure 5:
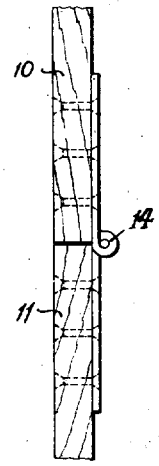
Fig. 5 is a fragmentary edge elevation of the main and secondary panels of the device disclosing one form of hinge connection therebetween.

Arranged upon the side boards of the window frame A directly at the edges of the main panel 10 and above the lower edge thereof are pivot plates 26—26 to each of which is horizontally pivotally secured as at 27 in Figure 4 a depending socket member 18. Threaded within these socket members are the reduced threaded ends of supporting bars or poles 19—19 that are pivoted adjacent their outer ends to the edges of the sub-panel 11 preferably through the medium of the ends of the outermost tie rod 13 passing therethrough as in Figure 1. The ends of these bars 19 preferably extend beyond their pivotal connection with the panel 11 and are provided at their ends with spear points 20.

One arrangement for the operation of the device consists in securing cord or cable 21 to the lower edge of sub-panel 11. This cord or cable extends upwardly from the lower edge of panel 11 over a pulley 22 inside the window frame at the upper portion thereof and then runs to a guide ring 23 nearer the bottom of the window frame as illustrated, and then to a fitting 23[a] on the lower panel 11 where it is fastened. In other words one end of the cord or cable is fastened adjacent the lower edge of panel 11 and the other end fastened in line therewith and adjacent the upper edge near hinge 14. Obviously when panels 10 and 11 are in closed position as illustrated in Fig. 1, the awning may be moved into open position by pulling the cord to raise the bottom edge of panel 11. By a pull of the cord the lower panel 11 will force upper panel 10 outwardly due to the lever arrangement of poles 19—19 with the lower panel. After being raised to the position show in Fig. 3, the weight of the panels will cause poles 19—19 to be maintained in open position due to the leverage exerted. In order to close the panels the cord is pulled in the opposite direction whereupon it will exert a pressure against the lower edge of panel 11 and force it downwardly. This action will cause rods 19—19 to shift in position. The leverage will be lost inasmuch as each pivoted rod 19 with the lower panel is in the nature of a toggle arrangement, and once the pivot point is shifted from the pressure-bearing position of Fig. 3, the weight of the panels will couse the rods to drop to the dotted line position. While the leverage arrangement is shown operated by a cord or cable, it is obvious that various mechanical expedients may be employed to effect the same result.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent, is:

1. The combination with a window frame, of a combined awning and shutter comprising a main rigid panel pivotally secured at its upper edge to the outer side of the window frame at the top thereof, a sub-panel hingedly secured at its upper edge to the lower edge of the main panel, a pair of bars pivoted at their inner ends to the respective sides of the window frame at the intermediate portion thereof, the outer ends of the bars being pivotally secured to the intermediate portion of the sub-panel, and flexible means attached to the lower edge of the sub-panel and operable from the inside of the window frame for swinging the sub-panel upwardly beneath the main panel and simultaneously urging the main panel outwardly to an awning forming position, said bars supporting the panels in the last mentioned position.

2. The combination with a window frame, of a combined awning and shutter, the same comprising main and sub-panels hingedly secured together at their adjacent edges, a weather strip extending across the top of the outside of the window frame, the upper edge of the main panel being hingedly secured to the underside of said strip, a pair of bars pivotally secured at their inner ends to the respective sides of the window frame at their intermediate portion thereof, the outer ends of said bars being pivotally secured to the respective side edges of the intermediate portion of the sub-panel, and flexible means attached to the lower free edge of the sub-panel and operable from within the window frame to swing the sub-panel upwardly beneath the main panel and simultaneously dispose the panels in an inclined awning forming position, said bars supporting the panels in this position.

3. A combination awning and shutter comprising a plurality of panels, one of which is adapted to be swingably secured to a frame, another of said panels hingedly secured to the first panel, a supporting member adapted to be pivotally attached at one end to the frame and at the other end to the other of said panels for supporting said panels outwardly from said frame in the form of an awning.

4. A combination awning and shutter of solid material having a plurality of related sections, one of said sections being adapted to assume a position as an awning having its lower edge in the form of a scalloped fringe, said section interengaging with another section having a corresponding fringe when in shutter-closure position.

5. In an awning, a panel adapted to be pivotally connected to a frame member, a second panel pivotally connected to the first panel and having movement relative to and with the first panel, a strut for supporting said panels in raised position, said strut being pivotally connected to said second panel to one side of the latter panel's pivotal connection to the first panel, and means connected to said second panel for imparting movement thereof relative to the other panel.

6. An awning including a pair of hingedly connected panels, means associated with the uppermost panel for swingingly mounting both of said panels, and means pivotally secured to the lowermost panel and to a point adjacent a casement whereby to retain said panels folded upon themselves and extending at an angle to such casement, and to cause said panels to extend into substantially the same plane and to lie adjacent the plane of such casement.

7. An awning including a pair of hingedly connected panels, means associated with the uppermost panel for swingingly mounting both of said panels, means pivotally secured to the lowermost panel and to a point adjacent a casement whereby to retain said panels folded upon themselves and extending at an angle to such casement, and to cause said panels to extend into substantially the same plane and to lie adjacent the plane of such casement, and means associated with one of said panels to effect a shifting of both of the same from one to the other of the positions afore-stated.

8. A combined awning and shutter comprising a plurality of sections connected to each other, said sections having complementary scalloped adjacent edges whereby when said sections extend in substantially the same plane, a unitary structure is presented and when said sections extend at angles with respect to each other, a lower edge in the form of a fringe is presented, and means for causing said sections to extend in substantially the same plane and at angles with respect to each other.

In testimony whereof, we affix our signatures.

JOSEPH S. BUCKNAM, Jr.
WILSON F. DE GROAT.